Dec. 17, 1968  L. A. MORTENSEN  3,416,650
HOLDER FOR SCREW ANCHORS
Filed Sept. 2, 1966

INVENTOR
LOUIS A. MORTENSEN
BY
ATTORNEYS

United States Patent Office 3,416,650
Patented Dec. 17, 1968

3,416,650
HOLDER FOR SCREW ANCHORS
Louis Ackersberg Mortensen, Kongevejen 35,
Birkerod, Denmark
Filed Sept. 2, 1966, Ser. No. 576,934
Claims priority, application Denmark, Sept. 4, 1965,
4,559/65
7 Claims. (Cl. 206—47)

ABSTRACT OF THE DISCLOSURE

A holder for screw anchors is equipped with means for measuring the diameter of the drill and of a screw suitable to be used in connection with the screw anchors retained in the holder.

---

Figure 1:
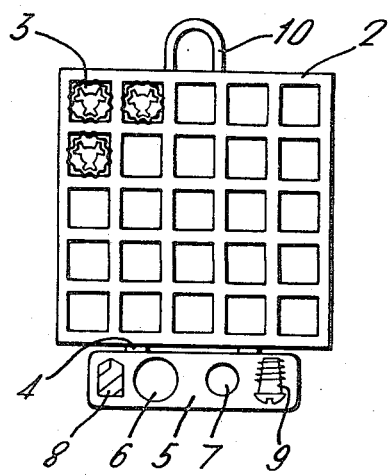

The invention relates to a holder for screw anchors, particularly a holder of plastic for holding screw anchors of plastic, e.g. a frame-shaped holder with holes through which the screw anchors extend, said screw anchors being retained in said holes by means of friction.

Previously, such holders were inscribed with information about which size drill and which size screw should be used together with screw anchors of the size in question. However, it will often be difficult for the user to ascertain whether the correct sizes are being used, because normally no suitable measuring instruments such as a slide gauge are at the user's disposal. It is true that the size normally is inscribed on the drills, but this inscription may very easily be worn off. The result of using a drill or screw with a wrong size is an unsatisfactory anchoring.

The object of the invention is to devise a holder where this drawback has been remedied so that the user easily can make sure that the correct size drill and screw is being employed. According to the invention this is obtained by providing the holder with means to measure the diameter of the drills and screws to be employed together with the screw anchors so as to ensure that drills and screws with the correct size are used. As these measuring or checking means are present on the holder itself, it is easy and quick for the user to carry out the checking and thereby ensure that the desired result will be obtained. The holder should preferably be made of plastic or some other durable material, so that the measuring or checking means may be used suitably many times without being ruined.

The measuring or checking means may be of different designs, e.g. as fork calipers, but according to the invention they may advantageously be made as a hole for a drill with the correct size and a hole for a screw with the correct size. In this manner it is easy for the user to carry out the checking. The measuring or checking means may furthermore according to the invention be made in a plate-shaped portion of the holder. In this manner an especially easy checking is obtained, particularly in the construction with holes, as the user only has to ascertain that the drill and the screw fit exactly into the holes when they are inserted into same. The measuring or checking means may, according to the invention, be made in a plate-shaped flap that is elastically connected with main portion of the holder. In this manner there is obtained the advantage that the flap, during forwardly and storing may be bent in against the main portion of the holder, so that it practically does not take up any space.

Beside a measuring or checking means for a drill the holder may, according to the invention, have a picture of a drill, and beside a measuring or checking means for screws the holder may have a picture of a screw. In this manner the correct use of the holder is considerably simplified.

The measuring or checking means may, according to the invention, be made in a rectangular plate that at both its side edges carriers screw anchors, e.g. die cast as an integral portion of the plate. In this manner an advantageous holder is obtained, especially for a relatively small amount of anchors.

Figure 2:
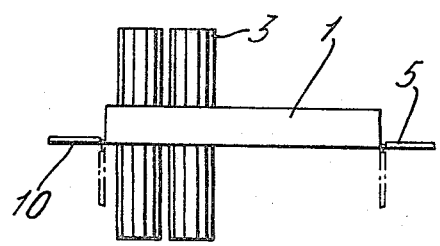
Figure 3:
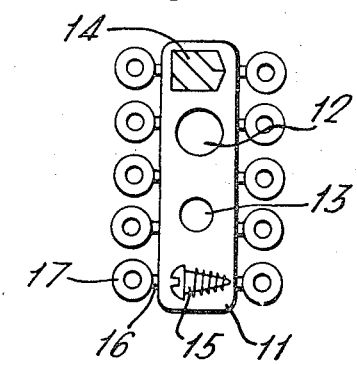
Figure 4:
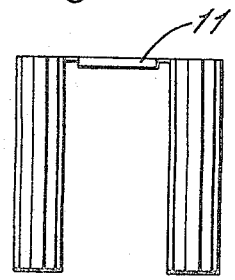

In the drawings there are shown two embodiments of a holder according to the invention, FIG. 1 showing a plan view of one embodiment of the holder wtih inserted anchors, FIG. 2 a lateral view of same, FIG. 3 a plan view of another embodiment with corresponding anchors, and FIG. 4 a lateral view of same.

The holder shown in FIGS. 1 and 2 is die cast from plastic and is made in the shape of a square frame with six rods 1 in one direction and six rods 2 in the other direction, so that 25 holes are formed. The rods 1 and 2 are cast with thin fins projecting into the holes. Screw anchors 3 are inserted in the holes, said anchors 3 having such a diameter that they deform the fins during insertion whereby a very sure fixation is obtained.

At one of the lateral rods 2 there is—during the die casting—fored two thin hinge bands 3 for elastic retainment of a plate 5 in which a circular hole and a smaller circular hole 7 have been made. Beside the hole 6 there is a picture 8 of a drill, and beside the hole 7 there is a picture 9 of a screw. The hole 6 has such a size that it fits a drill with a size suitable for employment together with the screw anchors 3 in the holder, and the hole 7 has such a size that it fits a screw with a size suitable for employment together with the anchors in the holder.

When using the holder in FIGS. 1 and 2 first a control of the drill is carried out whereafter the hole is bored, an anchor is inserted in said hole, and a screw controlled by means of the hole 7 is inserted into the anchor.

At the rod 2 opposite the plate 5 there is die cast a loop 10 for suspending the holder. During forwarding and storing the plate 5 and the hoop 10 may bent inwards against the side of the holder with the anchors so that said hoop and plate practically do not take up any space.

The holder shown in FIGS. 3 and 4 is die cast integrally with ten screw anchors. It consists substantially of a rectangular plate 11 in which there is a hole 12 and a smaller hole 13. Beside the hole 12 there is a picture 14 of a drill and beside the hole 13 there is a picture 15 of a screw. At each of the two longitudinal sides of the plate 11 there is—during the die casting—formed thin connecting bands 16, each of said bands carrying a screw anchor 17. Said bands 16 are so thin that they simply are snapped when the anchors are needed. The holes 12 and 13 are used in the same manner as in the embodiment shown in FIGS. 1 and 2.

The shown and described embodiments are only to be considered by way of example, as different variations are conceivable within the scope of the invention. In connection with a hole frame similar to the one shown in FIGS. 1 and 2, two of the holes in the frame could thus possibly be used as measuring or checking means for drill and screws, so that the plate 5 can be eliminated, but in such a construction some of the capacity of the holder will be lost. The embodiment shown in FIGS. 3 and 4 could be modified in such a manner that there only are anchors on one side of the plate, and the plate could be elastically connected with the anchors so that it could be swung in against the side of the latter so that a construction with small space requirements is obtained.

What I claim is:

1. A holder for screw anchors comprising a frame-shaped body having a plurality of holes; a plurality of screw anchors retained by friction in said holes; and a plate-shaped flap elastically connected to a portion of said body, said flap having a first opening for measuring the diameter of a drill and a second opening for measuring the diameter of a screw, to be used in connection with said screw anchors.

2. A holder for screw anchors as set forth in claim 1 also comprising identification means for said drill adjacent said first opening and identification means for said screw adjacent said second opening.

3. A holder for screw anchors as set forth in claim 1, wherein said holder is made of plastic material.

4. A holder for screw anchors as set forth in claim 1, wherein said anchors are made of plastic material.

5. A holder for screw anchors comprising a body; a plurality of screw anchors; a plurality of connecting means for connecting each of said screw anchors to said body, said screw anchors and said connecting means being integral with said body, said connecting means being designed to permit separation of individual screw anchors from the body; and a pair of measuring means located in said body for measuring the diameter of a drill and the diameter of a screw to be used in connection with said screw anchors.

6. A holder for screw anchors as set forth in claim 5 also comprising identification means for said drill adjacent said measuring means for measuring the diameter of said drill and identification means for said screw adjacent said measuring means for measuring the diameter of said screw.

7. A holder for screw anchors comprising a flat body having a plurality of holes; a plurality of screw anchors retained in said holes; a first measuring means disposed in said body for measuring the diameter of a drill and a second measuring means disposed in said body for measuring the diameter of a screw, said diameters of the drill and of the screw correspond to the size of said screw anchors.

References Cited

UNITED STATES PATENTS

| | | | |
|---|---|---|---|
| 1,025,255 | 5/1912 | Driver | 211—69 |
| 1,246,536 | 11/1917 | Bristol | 211—69 |
| 2,593,042 | 4/1952 | Lynskey | 211—69 XR |
| 2,736,426 | 2/1956 | Hamilton | 211—69 XR |
| 2,935,206 | 5/1960 | Smith | 206—72 XR |

ROY D. FRAZIER, *Primary Examiner.*

WILLIAM D. LOULAN, *Assistant Examiner.*

U.S. Cl. X.R.

206—56, 79; 211—72